United States Patent [19]
Barth et al.

[11] Patent Number: 5,333,831
[45] Date of Patent: Aug. 2, 1994

[54] HIGH PERFORMANCE MICROMACHINED VALVE ORIFICE AND SEAT

[75] Inventors: Phillip W. Barth, Portola Valley; Gary B. Gordon, Saratoga, both of Calif.

[73] Assignee: Hewlett-Packard Company, Palo Alto, Calif.

[21] Appl. No.: 19,945

[22] Filed: Feb. 19, 1993

[51] Int. Cl.⁵ .................... F16K 31/02; F16K 7/14
[52] U.S. Cl. .................... 251/11; 25/129.01; 25/368
[58] Field of Search ............ 251/129.01, 368, 11

[56] References Cited

U.S. PATENT DOCUMENTS

| | | |
|---|---|---|
| 4,007,464 | 2/1977 | Bassous et al. . |
| 4,169,008 | 9/1979 | Kurth . |
| 4,581,624 | 4/1986 | O'Connor . |
| 4,826,131 | 5/1989 | Mikkor ................. 251/368 X |
| 4,907,748 | 3/1990 | Gardner et al. . |
| 4,966,646 | 10/1990 | Zdeblick . |
| 5,058,856 | 10/1991 | Gordon et al. . |
| 5,069,419 | 12/1991 | Jerman . |
| 5,176,358 | 1/1993 | Bonne et al. ............ 251/368 X |

OTHER PUBLICATIONS

Sequin, Carlo H., "Computer simulation of anisotropic crystal etching," *Sensors and Actuators*, A.34 (1992), pp. 225-241.

*Primary Examiner*—Arnold Rosenthal

[57] ABSTRACT

A microminiature valve includes a crystalline substrate having a flow via and a raised valve seat structure. The valve seat structure has a planar bearing surface. The inner edge of the bearing surface defines an orifice to the flow via. The flow via has a varying cross sectional area and is narrowest at the orifice. From both the inner and outer edges of the bearing surface, parallel sloped walls along {111} planes are formed by an anisotropic etch. The microminiature valve has a high ratio of the area of the flow via at the orifice to the area within the outer edges of the valve seat structure.

12 Claims, 8 Drawing Sheets

HIGH PERFORMANCE MICROMACHINED VALVE ORIFICE AND SEAT

TECHNICAL FIELD

The present invention relates generally to microminiature devices and more particularly to microminiature valves.

BACKGROUND ART

Many techniques used in the fabrication of electronic integrated circuit chips lend themselves readily to micromachining mechanical devices from semiconductor substrates. U.S. Pat. No. 5,058,856 to Gordon et al. describes a thermally actuated microminiature valve having a seat substrate that is fabricated using a first semiconductor wafer. The seat substrate includes a flow via and a raised valve seat structure that surrounds the flow via at a front surface. A second semiconductor wafer is patterned to include a central armature for alignment with the raised valve seat structure and to further include an array of legs extending from the central armature. Each leg has two metallic layers, with each of the two metals having substantially different coefficients of thermal expansion. As the legs are heated, the difference in thermal expansions of the two metallic layers causes the legs to arch, thereby displacing the central armature relative to the flow via. The Gordon et al. patent is assigned to the assignee of the present application and is incorporated herein by reference.

Micromachined valves are becoming increasingly common. U.S. Pat. Nos. 4,581,624 to O'Connor and 5,069,419 to Jerman also teach microminiature valves. While these patents do not include the array of legs described in the Gordon et al. patent, a common feature is an axially movable armature that includes a smooth silicon surface known as a valve face. The valve face opens and closes against a valve seat structure surrounding a flow via.

Within the above-cited prior art patents, fabrication practicalities play a major role in determining the design of the microminiature valve. Because of the uncertainties in etch rates within semiconductor fabrication, manufacturing tolerances are imposed upon the design of valve features. Overetching and underetching during creation of microminiature features must be considered. Another fabrication concern is that of misalignment, particularly in etching the flow via through the seat substrate of the valve.

It is an object of the present invention to provide a microminiature valve and a method of fabricating such a valve, wherein the pneumatic characteristics and thermal characteristics are improved without rendering the valves susceptible to a low manufacturing yield.

SUMMARY OF THE INVENTION

The above objects have been met by a microminiature valve for controlling the flow of a fluid, wherein the valve includes a unitary substrate having a flow via defined by walls along {111} planes that originate at a load-bearing surface of a raised valve seat. Radially outward walls of the valve seat also have a {111} orientation. The features of the valve seat and the flow via are not susceptible to lateral misalignment, since the critical features are formed by an anisotropic etch at the substrate surface having the raised valve seat. The method provides a self-aligned structure and is not overly sensitive to etch rates.

The anisotropic etching forms parallel radially outwardly sloping walls that originate at the opposed sides of the bearing surface of the valve seat. The load-bearing surface is sufficiently wide that the valve seat is not susceptible to fracturing upon closing of an armature, but is sufficiently thin to improve the pneumatic and thermal characteristics of the valve. The pneumatic characteristics are improved because the structure provides a superior ratio of the area of the flow via at the inner perimeter of the bearing surface to the area within the outer perimeter of the bearing surface. The thermal characteristics are improved because the valve seat can be etched to include parallel inner and outer walls in a manner so as to reduce the capacity of thermal energy to migrate from a thermally actuated armature to the substrate in which the flow via has been formed.

The anisotropic etching provides a constant valve seat geometry regardless of etching time. The duration of the etching affects the depth of the valve seat, but after formation of the parallel {111} oriented walls, the cross sectional configuration of the valve seat is generally fixed.

Fabricating the microminiature valve includes masking selected portions of both the front and back surfaces of the substrate. A first region is left exposed at the back surface. Etching the exposed first region forms a via either partially or entirely through the substrate. Preferably, the etching is an anisotropic etch that forms {111} walls. A mask on the front surface is patterned to define the bearing surface of the valve seat. An anisotropic etch is performed for a sufficient time to create {111} walls that define an increasingly widening flow via with departure from the bearing surface. Walls having a {111} orientation are also formed into the front surface at sides of the mask that are opposite to the flow via. In a preferred embodiment, the fabrication of the flow via includes a migrating intermediate wall having a major directional component along the vertical.

In the design of microminiature valves, there is a conflict between increasing the area of the flow via and decreasing the area bordered by the outer periphery of the valve seat. An increase in the area of the flow via results in a greater volume of fluid flow when the valve is in an open position. However, such an increase is typically achieved by increasing the size of the valve seat. Since the fluid pressure that can be controlled by the valve is closely approximated by dividing the force applied at a thermally driven actuator by the perimeter area of the valve seat, an increase in the outer perimeter results in a decrease in the fluid pressure that can be controlled. As noted above, the present invention provides an improved ratio of the area of the flow via to the area within the outer perimeter of the bearing surface of the valve seat. Thus, for a given outer perimeter, a greater volume of fluid can be controlled.

Another advantage of the present invention is that there is a reduction in wasted power, where wasted power is defined as that power which does not go directly to changing the temperature of a thermally driven actuator. Because there is contact between the actuator and the valve seat, there exists a thermal conductance path from the actuator to the valve seat substrate. This path extends from the inner face of the armature and the bearing surface, through the valve seat and into the bulk of the valve seat substrate. The {111} walls at the opposed sides of the bearing surface of the present invention permit a reduction of the thermal conductivity from the actuator to a seat substrate.

Another advantage of the present invention is that the method of forming the microminiature valve is one in which the flow orifice and the valve seat are self-aligned, so that the fabrication process is not susceptible to overetching and underetching.

BEST MODE FOR CARRYING OUT THE INVENTION

Figure 1:
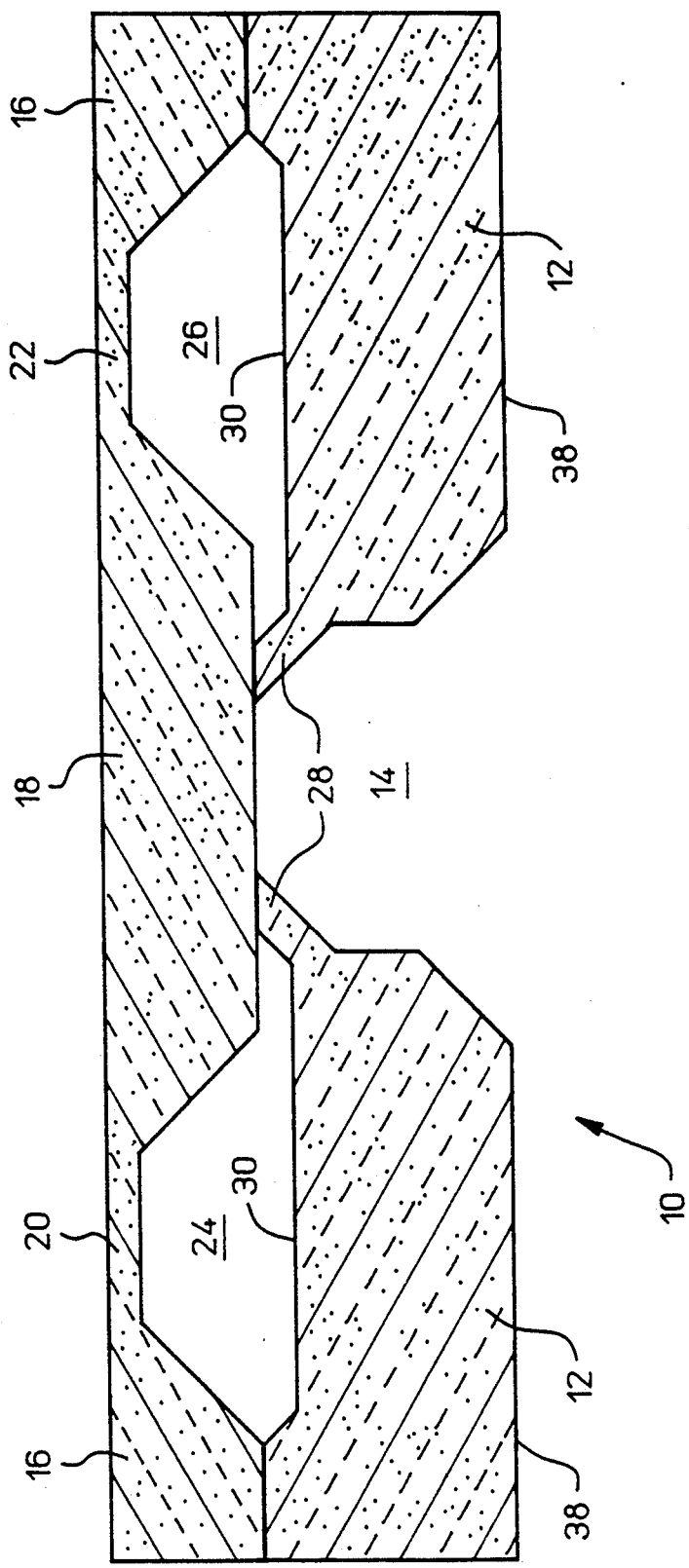
FIG. 1 is a side sectional view of a microminiature valve having a flow orifice and a valve seat in accordance with the present invention.

With reference to FIG. 1, a microminiature valve 10 is shown as including a seat substrate 12 which acts as a base. A central flow via 14 is formed through the seat substrate.

The seat substrate 12 is preferably a silicon chip which has been fabricated from a wafer using batch processing steps. The microminiature valve 10 is 7 mm by 7 mm, but this is not critical. At its periphery, the seat substrate is 400 microns thick.

Supported atop the seat substrate 12 is a second substrate that includes a fixed periphery 16 and a central armature 18. The length and the width of the second substrate match the dimensions of the seat substrate 12. Again, the preferred material is silicon. The thickness of the silicon is 30 microns, but since the thickness is a factor in determining the amount of maximum opening of the microminiature valve 10, the ideal thickness of the silicon layer will vary according to application.

The structure and the operation of the upper substrate that includes the fixed periphery 16 and the central armature 18 are fully described in U.S. Pat. No. 5,058,856 to Gordon et al., which is assigned to the assignee of the present invention and is incorporated herein by reference. Briefly, a layer of nickel is deposited and patterned on the upper substrate using the techniques of evaporation, photolithography and electroplating. An array of legs 20 and 22 join the fixed periphery 16 to the central armature 18. When the upper substrate is heated, the difference in coefficients of thermal expansion of the silicon and the nickel causes the legs to arch, lifting the armature 18 away from the seat substrate 12. When the armature is spaced apart from the seat substrate, the flow via 14 is in fluid communication with surrounding areas 24 and 26. In turn, these areas 24 and 26 are in fluid communication with an apparatus to or from which flow is to be regulated by the microminiature valve 10.

While the microminiature valve 10 has been described as including an array of legs 20 and 22, the present invention is not limited to use with actuation by means of arching legs. For example, the structure that connects the central armature 18 to the fixed periphery 16 may instead be a solid circular diaphragm which is selectively deflected to regulate fluid flow between the flow via 14 and the areas 24 and 26.

Figure 2:
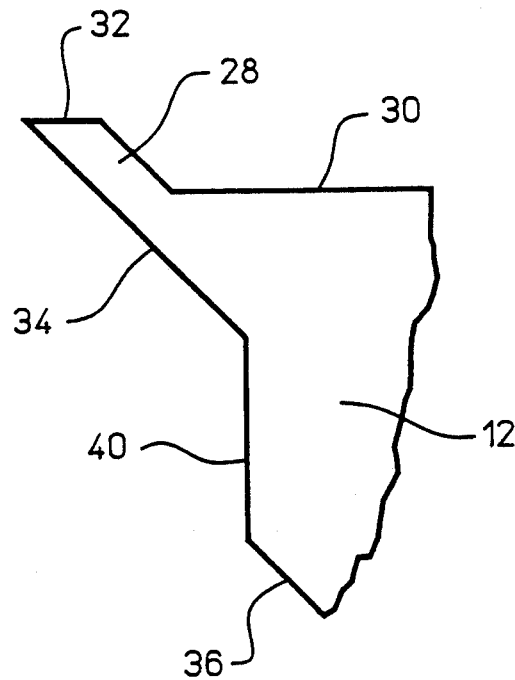
FIG. 2 is a side view of the valve seat of FIG. 1.

The structure important to the present invention is shown in FIGS. 1 and 2. The seat substrate 12 includes a valve seat 28 extending upwardly from an upper major surface 30. The valve seat includes a bearing surface 32 against which the armature 18 is seated when the armature is in the closed position.

As will be described more fully below, the valve seat 28 and the flow via 14 are formed by anisotropically etching the seat substrate 12 at the upper surface of the substrate. From the radially inward edge of the bearing surface 32, the valve seat extends downwardly along a {111} plane to form a first sloped wall 34. As is well known in the art, angles of approximately 54.7° are formed by anisotropically etching the silicon substrate, so that the first sloped wall 34 is at an angle of approximately 125.3° relative to the bearing surface 32. A second sloped wall 36 is formed parallel to the first sloped wall and extends downwardly to a lower major surface 38 of the seat substrate 12. An intermediate wall 40, which is generally vertical, joins the first and second sloped walls.

The width of the valve seat 28 is readily varied, but is chosen to be sufficiently great that the valve seat is not susceptible to fracturing upon repeated closing of the armature 18. However, since the fluid pressure against which the valve can open is influenced by the measure of the area within the radially outward edge of the bearing surface 32, the width of the valve seat should not be unnecessarily great. In a preferred embodiment, the flow orifice 14 is 200 microns square, while the radially outward periphery of the bearing surface 32 is 240 microns square. The configuration of the valve seat 28 and the flow orifice 14 improve both the pneumatic and thermal characteristics of the microminiature valve 10, as compared to the prior art.

Figure 3:
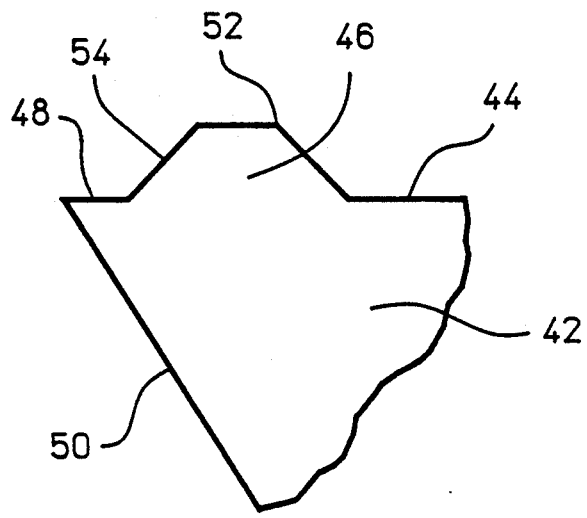
FIG. 3 is a side view of a prior art valve seat of a microminiature valve.

FIG. 3 shows a typical prior art valve seat. A seat substrate 42 includes an upper surface 44 having a raised valve seat 46. The upper surface 44 includes a ledge 48 between the valve seat and a wall 50 of a flow via. At its outer perimeter 52, the valve seat 46 slopes downwardly to the surface 44. At the opposite side, the valve seat has a sloped wall 54 to the ledge 48.

One goal in fabricating a microminiature valve is to reduce the area within the outer perimeter 52 of the valve seat 46, thereby allowing the valve to open against greater fluid pressures. Another goal is to increase the size of the flow via defined by the wall 50, so as to increase the volume of gas that can be controlled by the valve. Because the valve seat is etched from one side of the seat substrate 42 while the flow via is etched from the other side, it is difficult to simultaneously achieve these goals. Some allowance must be made for lateral misalignment of the flow via relative to the valve seat. Moreover, there must be an allowance for over etching or under etching. As a result, the ratio of the area of the flow via to the area within the outer perimeter 52 of the valve seat is one which necessarily involves inefficiency. The downwardly sloped wall 54 and the ledge 48 of the prior art impair the performance of microminiature valves, reducing their capability by orders of magnitude.

In contrast, the fabrication steps to be described below provide the less wasteful structure shown in FIG. 2. If in the preferred embodiment the flow orifice is 200 microns square and the area within the outer perimeter of the bearing surface 32 is 240 microns square, the area efficiency is 70%. This provides a flow efficiency of approximately 33%, far superior to the 0.03% efficiency of some prior art microminiature valves.

Returning to FIG. 3, in addition to improving the pneumatic characteristics of the prior art, the present invention has superior thermal characteristics. As previously noted, microminiature valves are thermally actuated devices. An upper substrate is heated to cause displacement of an armature relative to a valve seat 46. A goal in the design of valves is to minimize the waste of thermal energy. However, a thermal conductance path exists from an actuator to the valve seat 46 and through the structure below the valve seat to the bulk of the seat substrate 42. Referring to FIGS. 1 and 2, the conductance of this thermal path is significantly reduced by the present invention because of the geometry of the valve seat 28. Firstly, the etch depth can be greater. In the prior art, as the etch depth is increased, the oppositely sloped walls of the valve seat become undesirably thicker and the area of the via is reduced. However, the valve seat 28 of the present invention does not increase in width and does not reduce the size of the flow via as the valve seat is increased in depth. A depth of 25 microns is preferred.

The opposed parallel sides of the valve seat 28 provide a structure that is sufficiently robust to withstand repeated closings of the armature 18, but because the opposed sides are not diverging, the structure is sufficiently thin to guard against excess waste of thermal energy from the armature to the bulk of the seat substrate 12.

Minimizing the percentage of thermal energy lost through the valve seat 28 is important in achieving a stable valve operation at low flow rates. As a normally-closed thermally actuated valve opens during the application of power, the thermal conductance from an armature 18 through a valve seat 28 drops, since a gap appears between the armature and the valve seat. Thermal conductance occurs across this gap, but the escape of energy across the gap decreases as the valve continues to open.

Typically, a constant power is applied to the armature 18. When the valve is closed, thermal energy flows from the armature through the thermal conductance path described with regard to the valve seat 28, but also through separate thermal conductance paths that include structures radially outward of the armature and include convective and conductive flow into the gas or fluid that surrounds the armature. These three flows, occurring as power is applied to the armature, determine how far the ambient temperature and the temperature of the armature will rise.

As the valve begins to open and the conductance through the valve seat 28 decreases, the temperature of the armature rises. Consequently, the microminiature valve 10 becomes more energy efficient and the valve opens in a sudden manner. This effect is shown graphically in FIG. 4, which plots actuator displacement of a prior art armature versus applied power. It can be seen that displacement versus applied power is highly non-linear in the region of opening 56 and the region of closing 58.

Figure 4:
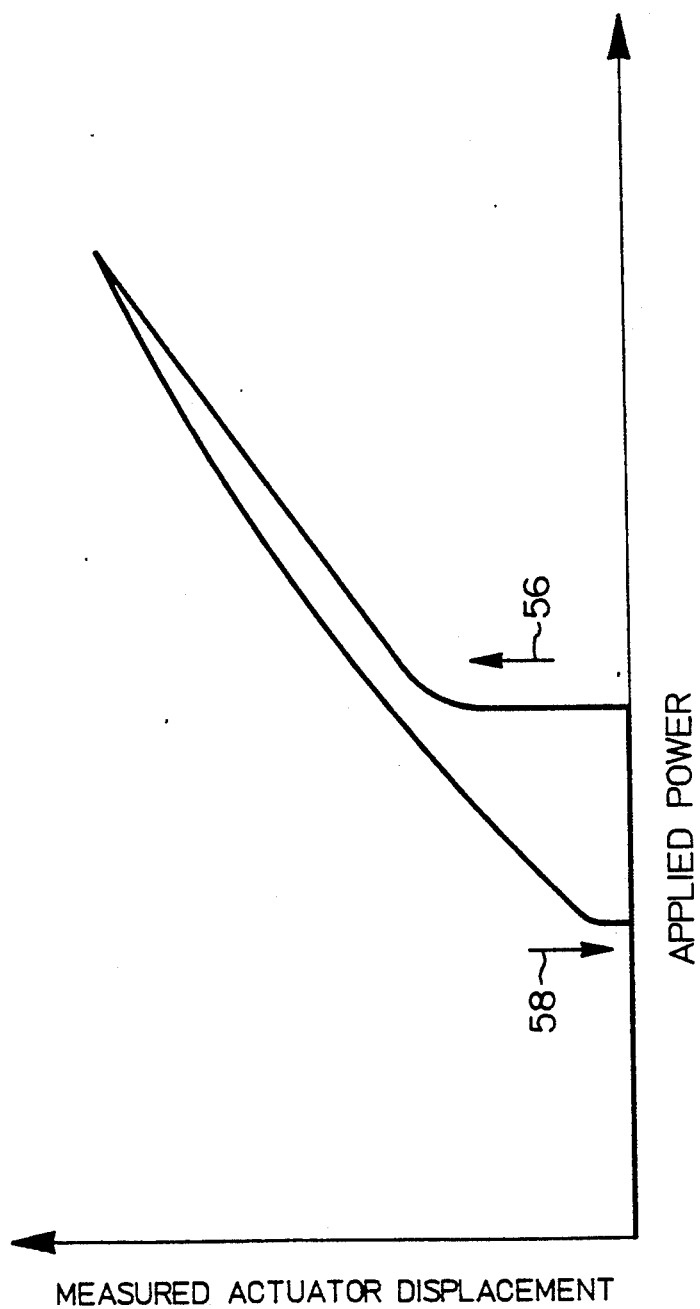
FIG. 4 is a graph of actuator displacement versus applied power to a prior art microminiature valve having the valve seat of FIG. 3.

The non-linearity of the prior art valve, as shown in the graph of FIG. 4, is primarily caused by the varying thermal conductance through the prior art valve seat. In most cases, the non-linearity is undesirable, since it reduces the control of the volume of gas through a flow via. The non-linearity is reduced in the present invention by reducing the percentage change in the total heat flow due to changes in the valve seat thermal conductance. Non-linearity can be reduced somewhat more by opening the armature 18 at an angle to the valve seat 28, so that the armature remains in contact with a portion of the valve seat for some or all of the valve opening procedure.

Figure 5:
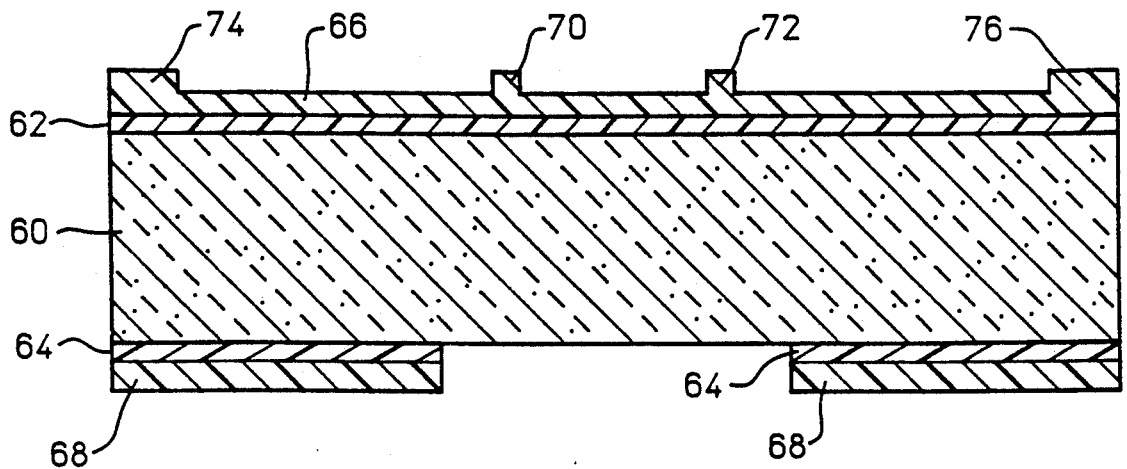
FIGS. 5-11 illustrate steps of one embodiment for fabricating the valve seat and flow orifice of FIG. 1.

FIGS. 5–10 illustrate a first method of manufacturing the seat substrate 12 of FIG. 1. In FIG. 5, conventional masking materials are photolithographically patterned at both of the major surfaces of the silicon wafer 60. Each major surface has a first layer of silicon oxide 62 and 64 and an outer layer of silicon nitride 66 and 68. Using conventional plasma etching techniques, approximately 50% of the nitride outer layer 66 at the upper surface is removed at portions of the layer, leaving thick nitride areas 70 and 72 for use in defining a valve seat and leaving outer thick nitride areas 74 and 76 for use in defining the extent of the upper valve face.

At the lower surface of the silicon wafer 60, the oxide and nitride layers 64 and 68 are completely etched at a central region. Hydrofluoric acid is used in etching the bottom oxide.

Figure 6:
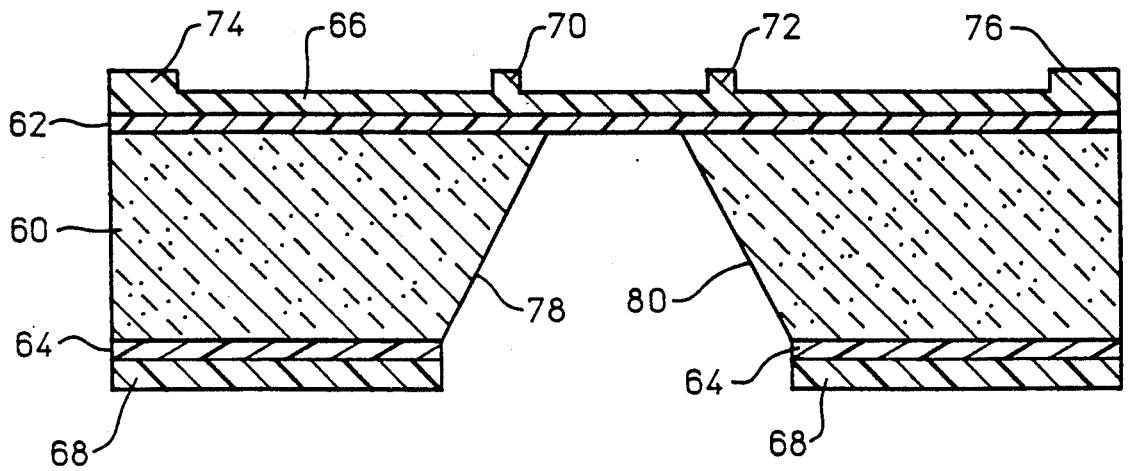

In FIG. 6, potassium hydroxide (KOH) is used to etch through the bottom of the silicon wafer 60 that was exposed in the etching of the silicon nitride layer 68 and the oxide layer 64. The silicon is etched far more slowly along {111} planes, thereby providing the sloped walls 78 and 80. Anisotropically etching the silicon wafer will produce walls having an angle of approximately 54.7°. The anisotropic etch extends completely through the silicon wafer, but halting the etching upon reaching the oxide layer 62 is not critical. A continued etch which would cause the upper silicon nitride layer 66 and the oxide layer 62 to break at the hole formed by the anisotropic etch, but would not adversely affect the fabrication of a seat substrate. That is, the step shown in FIG. 6 is not one that is sensitive to over etching.

Figure 7:
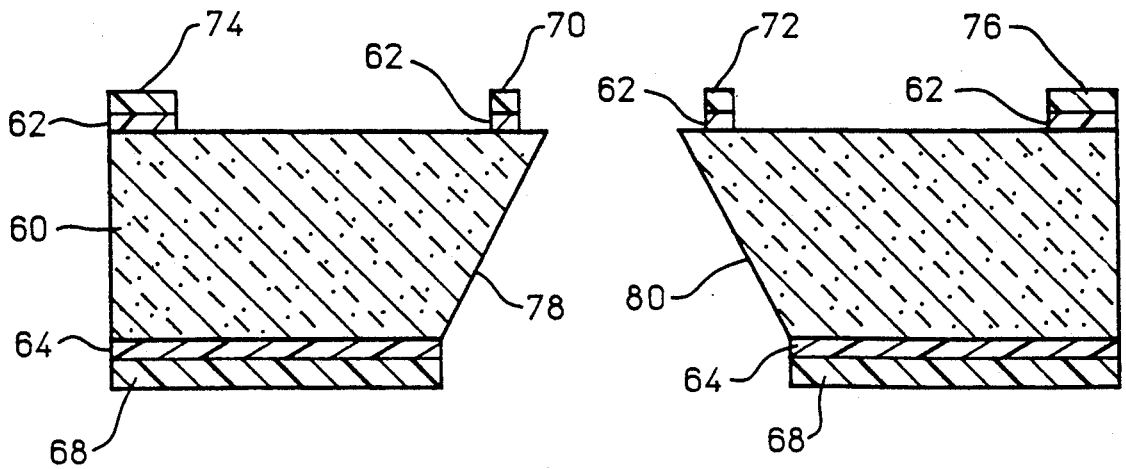

In FIG. 7, the silicon nitride layer is etched to leave only a portion of the previously thick areas 70–76 and to completely remove the nitride between the thick areas. Exposed oxide 62 is then etched in hydrofluoric acid. As a result, a central via having upper and lower orifices is formed entirely through the silicon wafer 60. However, the central via does not resemble the final flow via to be fabricated. Rather, the etch from the bottom surface of the silicon wafer 60 merely provides the "rough" shape of a flow via.

Figure 8:
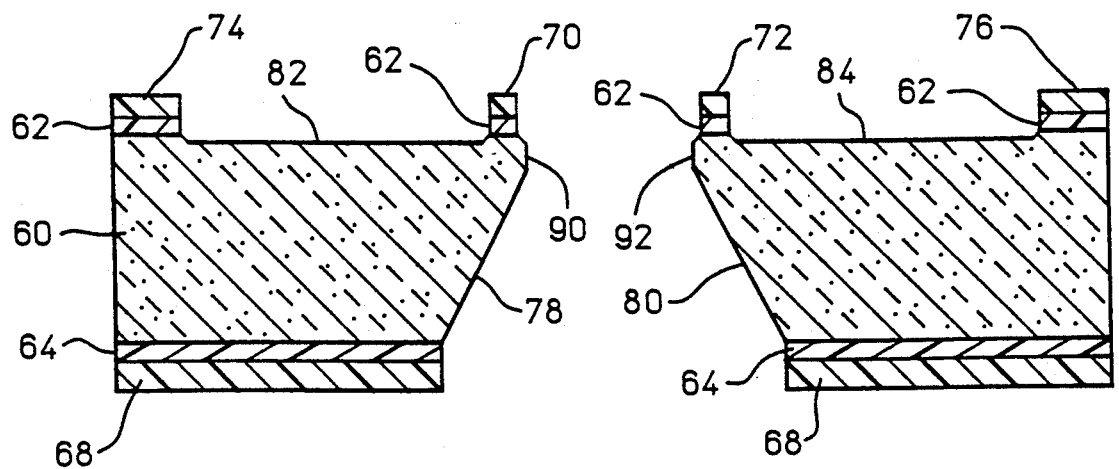

Referring now to FIG. 8, an anisotropic etch using KOH is then applied at both major surfaces of the semiconductor wafer 60. Exposed areas of the upper surface of the wafer are etched to form the inverted and truncated pyramidal faces 82 and 84. The depths of the truncated pyramidal faces will vary with the duration of the KOH etch.

Initially, the etching applied at the upper surface will create the sloped walls 86 and 88 that are angled downwardly and inwardly along {111} planes. Substantially vertical walls 90 and 92 connect the radially inwardly directed walls 86 and 88 to the previously formed walls 78 and 80.

Figure 9:
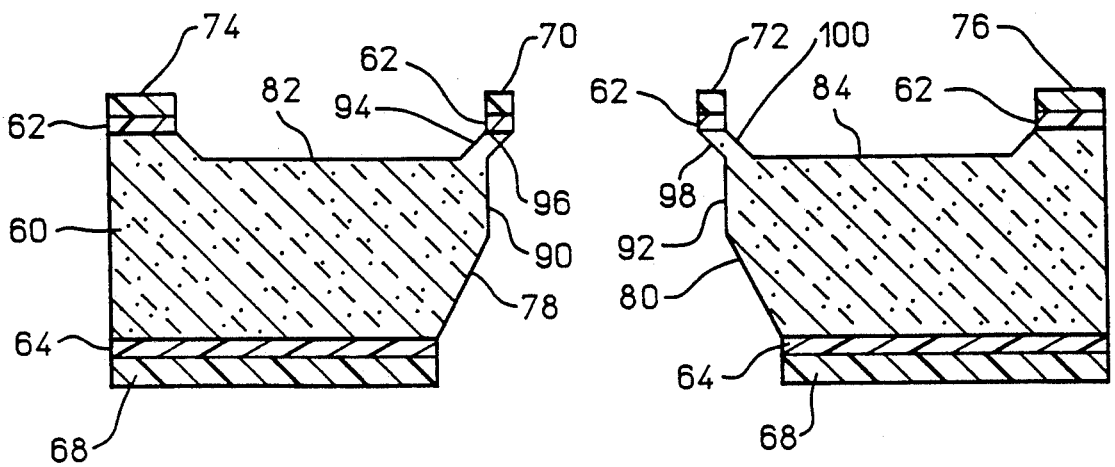

As the anisotropic etch at the opposed sides of the silicon wafer 60 continues, the vertical walls 90 and 92 migrate downwardly, as shown in FIG. 9. The final configuration of the valve seat begins to form, as the anisotropic etching that takes place at the upper surface provides parallel opposed walls 94 and 96 and parallel opposed walls 98 and 100. As shown in this figure, the depth of the inverted and truncated pyramidal faces 82 and 84 increases with the etching time.

Figure 10:
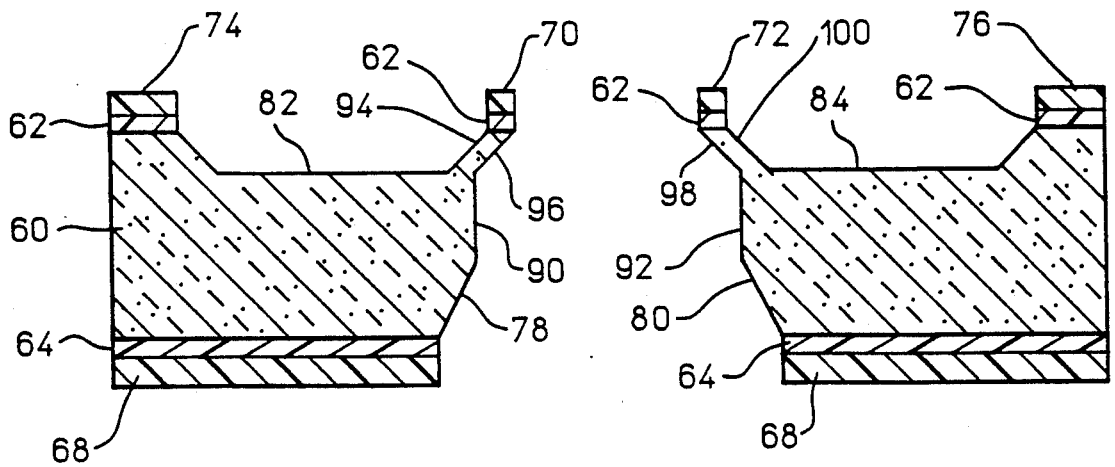

In FIG. 10, the vertical walls 90 and 92 have migrated downwardly and the pyramidal faces 82 and 84 have increased in depth. However, the cross sectional geometry of the valve seat as defined by the parallel walls 94 and 96 and the parallel walls 98 and 100 remains unchanged. As well known in the art, the geometry does change at corners of a mask, so that steps are taken to ensure suitable results at mask corners. If desired, the etching can continue until the vertical walls 90 and 92 reach the lower surface of the silicon wafer 60, thereby providing 90° corners at the orifice of the resulting flow via.

Figure 11:
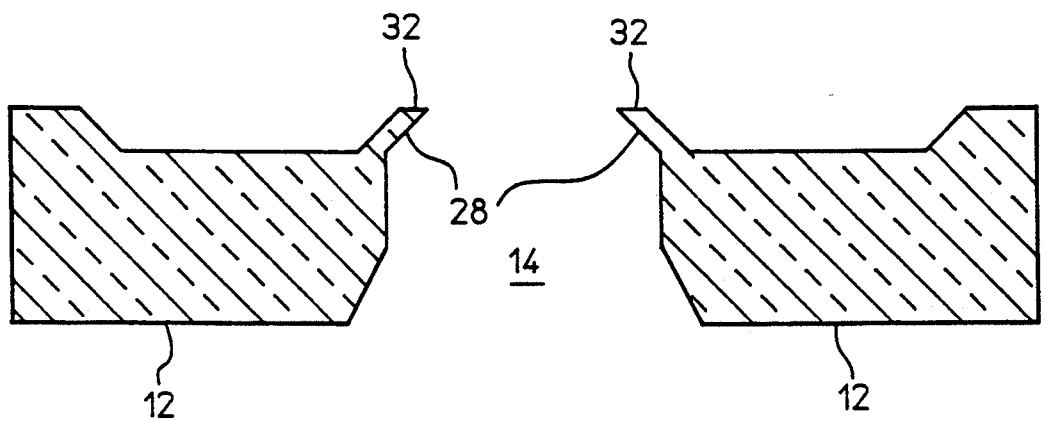

In FIG. 11, the masking material has been removed from the upper and lower surfaces of the silicon wafer, providing the seat substrate 12 of FIGS. 1 and 2. The substrate includes the valve seat 28 and the bearing surface 32 at the top of the valve seat. A central flow via 14 having the benefits described above is created.

Figure 12:
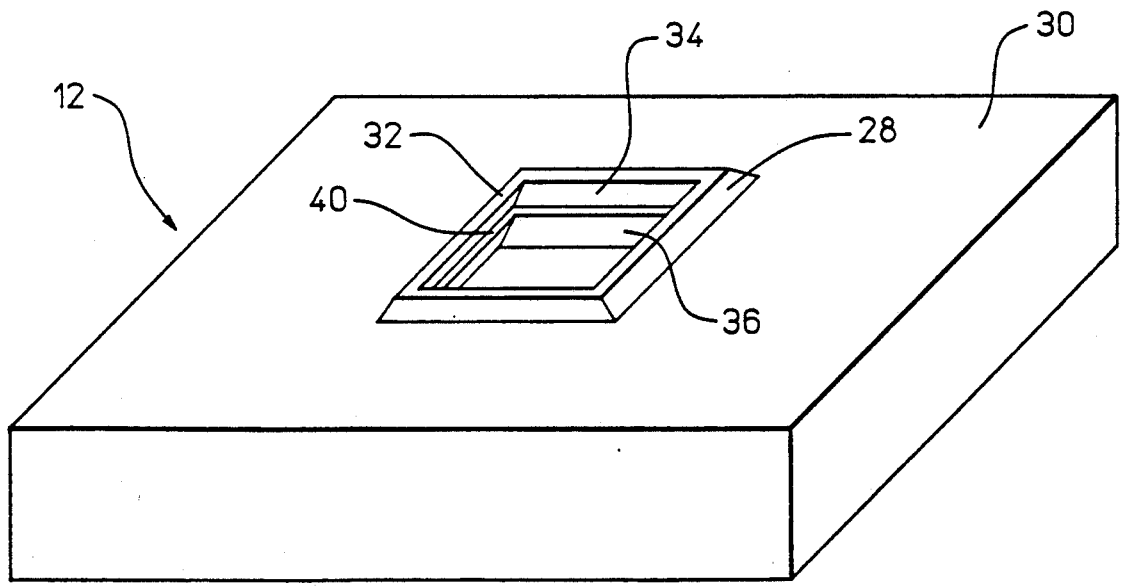
FIG. 12 is a perspective view of the substrate fabricated using the steps of FIGS. 5-11.
Figure 13:
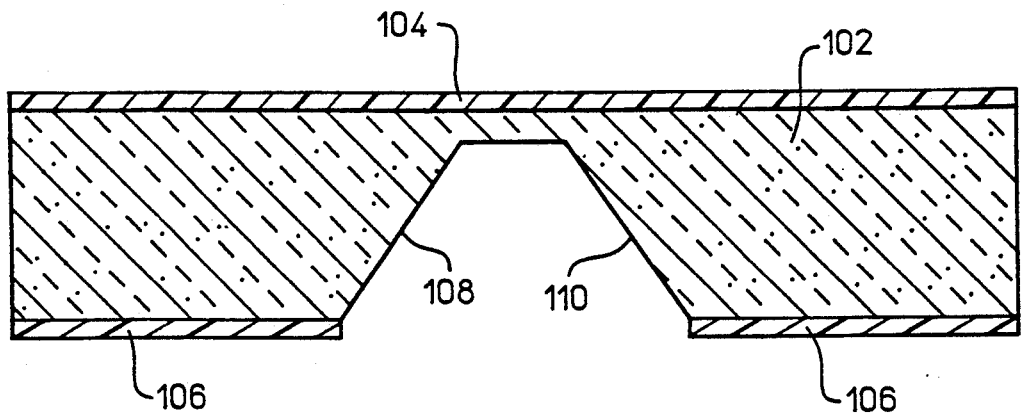
FIGS. 13-18 illustrate steps of a second embodiment for fabricating the substrate of FIG. 12.

FIG. 12 is a perspective view of the seat substrate 12, other than the raised area along the outer perimeter of the upper surface 30.

A second embodiment of forming a valve seat in accordance with the present invention is illustrated in FIGS. 13-18. A silicon wafer 102 is coated at a top surface with a layer of silicon nitride 104 and at a bottom surface with a photolithographically patterned layer 106 of silicon nitride. A KOH etch of the silicon wafer exposed by the patterned bottom layer 106 provides the orifice walls 108 and 110 having a {111} orientation. The anisotropic etch is terminated when the thickness of the silicon wafer is less than or equal to 50 microns.

Figure 14:
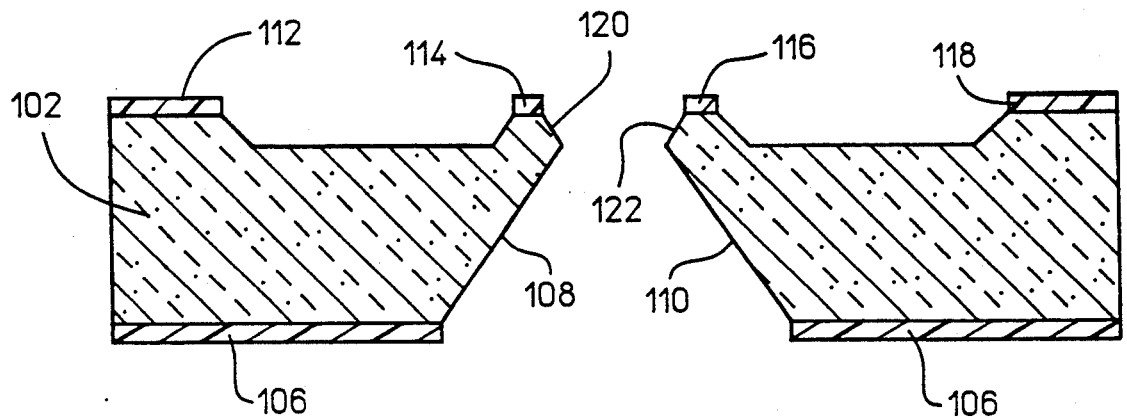
Figure 15:
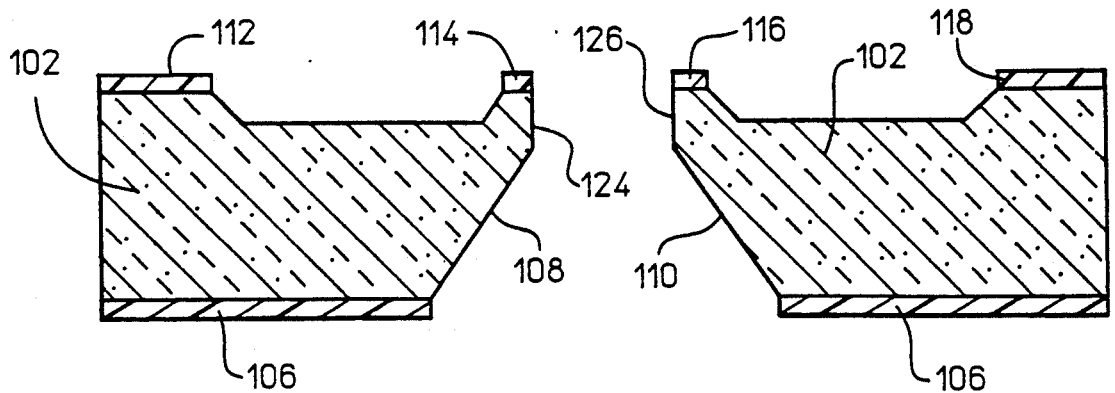

As shown in FIG. 14, the upper layer of silicon nitride is patterned to form protective regions 112, 114, 116 and 118. The silicon wafer is then etched from both sides in KOH. Inwardly sloped walls 120 and 122 having a depth of 25 microns or less are initially formed. However, as shown in FIG. 15, the opening through the silicon wafer widens until the outer edges of the opening meet the inner edges of the central protective regions 114 and 116 of silicon nitride. Thus, vertical via walls 124 and 126 are formed.

Figure 16:
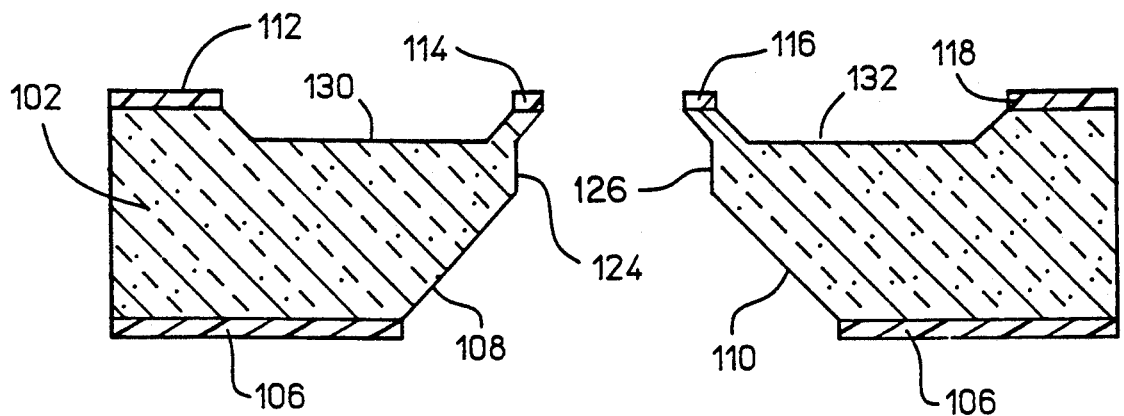
Figure 17:
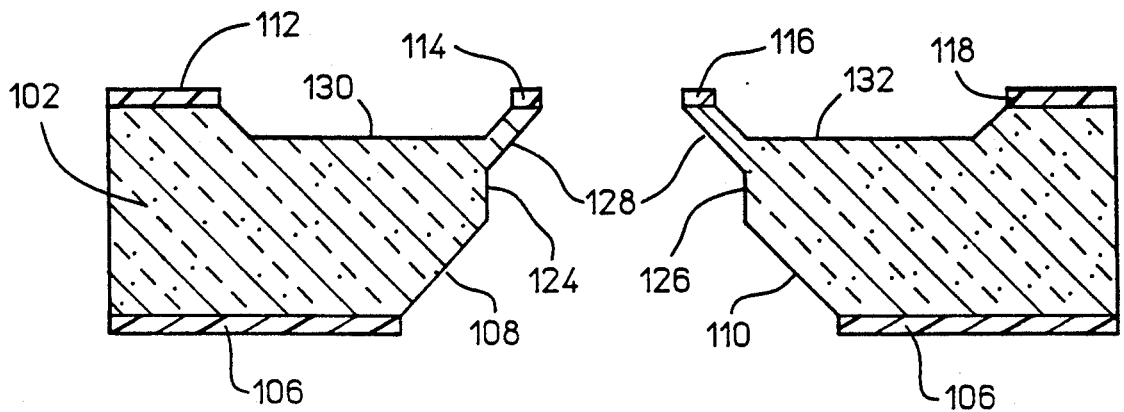
Figure 18:
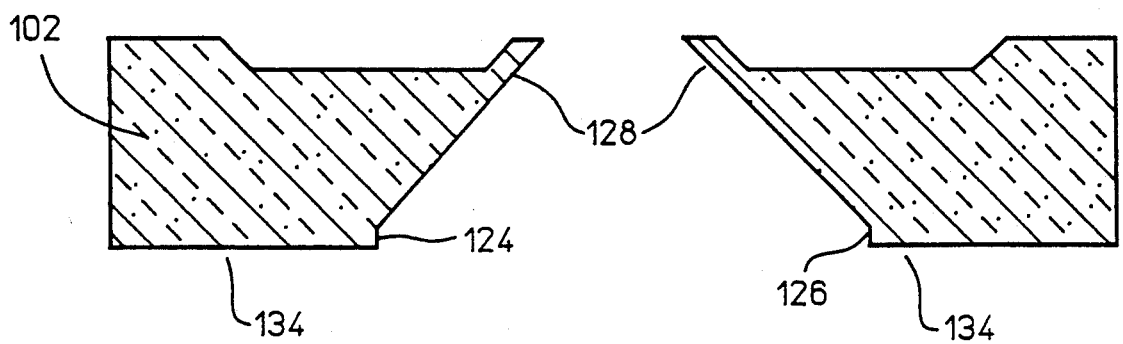

As shown in FIGS. 16 and 17, the vertical via walls 124 and 126 migrate downwardly as the anisotropic etching is continued. Thus, the fabrication process is not one that is sensitive to etching time. While not shown, the depth of a valve seat 128 is increased as the silicon wafer is etched at upper face regions 130 and 132.

The anisotropic etching may be continued until the vertical via walls 124 and 126 reach the level of the bottom surface 134 of the silicon wafer 102.

The present invention operates at fluid pressures up to 600 psi. This is a significant improvement over the prior art. Moreover, fluid flow can reach 1.5 liters per minute, as compared to 150 cc per minute of prior art devices.

While the present invention has been described as being used with a silicon substrate, other materials may be used. For example, gallium arsenide may be substituted. In addition, coatings such as silicon dioxide may be deposited or grown on the surface of the completed structure.

We claim:

1. A microminiature valve for controlling the flow of a fluid comprising, a unitary crystalline substrate having opposed first and second major surfaces and a flow via extending through said unitary substrate to said second major surface, said unitary substrate further having an integral valve seat structure extending from said first major surface to a side of said first major surface opposite to said second major surface, said valve seat structure having a bearing surface having an inner perimeter defining an orifice to said flow via, an armature having a planar face, said armature having a closed position wherein said planar face is in contact with said bearing surface of said valve seat structure to obstruct fluid flow through said orifice to said flow via, said armature further having an open position, and means for selectively displacing said armature between said closed and open positions, wherein said valve seat structure has a sloped interior such that said flow via increases in cross sectional area upon departure from said bearing surface.

2. The valve of claim 1 wherein said unitary substrate is a semiconductor substrate and said sloped interior of said valve seat structure is defined by {111} planes extending from said inner perimeter of said bearing surface.

3. The valve of claim 1 wherein said flow via has a four-sided configuration.

4. The valve of claim 1 wherein said flow via has a cross sectional area that decreases with departure from said second major surface.

5. A microminiature valve for controlling the flow of a fluid comprising, a semiconductor substrate having a flow via extending therethrough, said substrate having an upper surface having a raised area surrounding said flow via to define a valve seat, said substrate having a lower surface, said flow via having a plurality of sides, with each side having upper and lower walls, each upper wall being oriented along a {111} plane that is inclined inwardly along said raised area to a terminus of said flow via, and armature means having a closed position in contact with said raised area to block said flow via at said terminus and having an open position.

6. The valve of claim 5 wherein each side of said flow via has an intermediate wall joining said upper and lower walls, each intermediate wall being at a level below said upper surface of said substrate, each intermediate wall oriented along a plane having a major directional component along the vertical.

7. The valve of claim 5 wherein said raised area of said substrate has a bearing surface and has an inclined region extending from said upper surface of said substrate to said bearing surface in parallel relationship with said upper wall of said flow via.

8. The valve of claim 5 wherein said upper and lower walls of each side of said flow via are parallel walls along {111} planes.

9. The valve of claim 5 wherein said flow via has a minimum cross sectional area at said terminus and has a maximum cross sectional area at said lower surface.

10. A microminiature valve for controlling the flow of a fluid comprising, a unitary semiconductor substrate having opposed first and second major surfaces and a flow via extending from said first to said second major surface, said unitary substrate further having a valve seat structure integrally extending from the plane defined by said first major surface, said valve seat structure having a bearing surface having an inner perimeter defining an orifice to said flow via, an armature having a planar face, said armature having a closed position wherein said planar face is in contact with said bearing surface of said valve seat structure to obstruct fluid flow through said orifice to said flow via, said armature further having an open position, and means for selectively displacing said armature between said closed and open positions, wherein said valve seat structure has a sloped interior such that said flow via increases in cross sectional area upon departure from said bearing surface, said sloped interior being defined by {111} planes extending from said inner perimeter of said bearing surface to at least said plane defined by said first major surface.

11. A microminiature valve for controlling the flow of a fluid comprising, a unitary crystalline substrate having opposed first and second major surfaces and a flow via extending from said first to said second major surface, said unitary substrate further having a valve seat structure integrally extending from the plane of said first major surface, said valve seat structure having a bearing surface having an inner perimeter defining an orifice to said flow via, an armature having a planar face, said armature having a closed position wherein said planar face is in contact with said bearing surface of said valve seat structure to obstruct fluid flow through said orifice to said flow via, said armature further having an open position, and means for selectively displacing said armature between said closed and open positions, wherein said valve seat structure has a sloped interior such that said flow via increases in cross sectional area upon departure from said bearing surface, said sloped interior being a plurality of internal walls, said valve seat structure having a plurality of external walls extending from an outer perimeter of said bearing surface to said first major surface, each external wall being parallel to one of said internal walls.

12. The valve of claim 11 wherein said exterior walls are along {111} planes.

* * * * *

UNITED STATES PATENT AND TRADEMARK OFFICE
CERTIFICATE OF CORRECTION

PATENT NO. : 5,333,831

DATED : August 2, 1994

INVENTOR(S) : Phillip W. Barth and Gary B. Gordon

It is certified that error appears in the above-identified patent and that said Letters Patent is hereby corrected as shown below:

Column 10, line 18, "interior" should read -- substrate --.

Signed and Sealed this

First Day of November, 1994

Attest:

BRUCE LEHMAN

Attesting Officer

Commissioner of Patents and Trademarks